(12) United States Patent
Ichiyama et al.

(10) Patent No.: US 8,000,931 B2
(45) Date of Patent: Aug. 16, 2011

(54) DETERMINISTIC COMPONENT MODEL JUDGING APPARATUS, JUDGING METHOD, PROGRAM, RECORDING MEDIUM, TEST SYSTEM AND ELECTRONIC DEVICE

(75) Inventors: Kiyotaka Ichiyama, Saitama (JP);
Masahiro Ishida, Miyagi (JP);
Takahiro Yamaguchi, Miyagi (JP)

(73) Assignee: Advantest Corporation, Tokyo (JP)

( * ) Notice: Subject to any disclaimer, the term of this patent is extended or adjusted under 35 U.S.C. 154(b) by 531 days.

(21) Appl. No.: 12/256,478

(22) Filed: Oct. 23, 2008

(65) Prior Publication Data

US 2010/0106457 A1  Apr. 29, 2010

(51) Int. Cl.
*G06F 17/18* (2006.01)

(52) U.S. Cl. ............. 702/181; 702/79; 702/86; 702/69; 714/26; 714/E11.024; 714/704; 703/2; 375/371; 708/200; 708/271; 708/420; 708/443

(58) Field of Classification Search .................... 702/79, 702/181, 75, 76, 86, 69, 67, 189; 714/26, 714/E11.024, 704; 703/2; 708/309, 311, 708/200, 271, 420, 443; 375/371, 355, 359, 375/362

See application file for complete search history.

(56) References Cited

U.S. PATENT DOCUMENTS

| | | | | |
|---|---|---|---|---|
| 5,719,907 A * | 2/1998 | Kaku et al. | ..................... | 375/371 |
| 6,594,595 B2 * | 7/2003 | Yamaguchi et al. | ............. | 702/69 |
| 7,127,018 B2 * | 10/2006 | Yamaguchi et al. | .......... | 375/371 |
| 7,158,899 B2 * | 1/2007 | Sunter et al. | ..................... | 702/69 |
| 7,254,168 B2 * | 8/2007 | Guenther | ...................... | 375/226 |
| 7,263,150 B2 * | 8/2007 | Ishida et al. | ................... | 375/371 |
| 7,295,604 B2 * | 11/2007 | Cranford et al. | ............... | 375/226 |
| 7,512,177 B2 * | 3/2009 | Cranford et al. | ............... | 375/226 |
| 7,917,331 B2 * | 3/2011 | Ichiyama et al. | ............... | 702/179 |
| 2003/0018442 A1 * | 1/2003 | Yamaguchi et al. | ........... | 702/69 |
| 2003/0031284 A1 * | 2/2003 | Ishida et al. | ................... | 375/371 |
| 2004/0268190 A1 * | 12/2004 | Kossel et al. | ................. | 714/704 |
| 2005/0069031 A1 * | 3/2005 | Sunter et al. | .................. | 375/224 |
| 2005/0111536 A1 * | 5/2005 | Cranford et al. | ............... | 375/226 |
| 2006/0035207 A1 * | 2/2006 | Henson | .......................... | 434/350 |
| 2006/0251200 A1 * | 11/2006 | Miller | ............................ | 375/371 |
| 2007/0099633 A1 * | 5/2007 | Bamberger et al. | ........ | 455/456.2 |
| 2008/0098055 A1 * | 4/2008 | Yamaguchi et al. | .......... | 708/200 |
| 2008/0150599 A1 * | 6/2008 | Cranford et al. | ............... | 327/164 |

(Continued)

FOREIGN PATENT DOCUMENTS

WO  2007108492  9/2007

*Primary Examiner* — Carol Tsai
(74) *Attorney, Agent, or Firm* — Jianq Chyun IP Office

(57) ABSTRACT

Provided is a deterministic component model determining apparatus that determines a type of a deterministic component included in a probability density function supplied thereto, comprising a standard deviation calculating section that calculates a standard deviation of the probability density function; a spectrum calculating section that calculates a spectrum of the probability density function; a null frequency detecting section that detects a null frequency of the spectrum; a theoretical value calculating section that calculates a theoretical value of a spectrum for each of a plurality of predetermined types of deterministic components, based on the null frequency; a measured value calculating section that calculates a measured value of the spectrum for the deterministic component included in the probability density function, based on the standard deviation and the spectrum; and a model determining section that determines the type of the deterministic component included in the probability density function to be the type of deterministic component corresponding to a theoretical value closest to the measured value, from among the theoretical values for the plurality of types of deterministic components.

17 Claims, 15 Drawing Sheets

U.S. PATENT DOCUMENTS

| | | | |
|---|---|---|---|
| 2009/0094302 A1* | 4/2009 | Hollis | 708/271 |
| 2009/0234604 A1* | 9/2009 | Hou et al. | 702/69 |
| 2009/0326845 A1* | 12/2009 | Yamaguchi et al. | 702/76 |
| 2010/0106468 A1* | 4/2010 | Yamaguchi et al. | 703/2 |
| 2010/0106470 A1* | 4/2010 | Ichiyama et al. | 703/2 |
| 2010/0107009 A1* | 4/2010 | Yamaguchi | 714/26 |

* cited by examiner

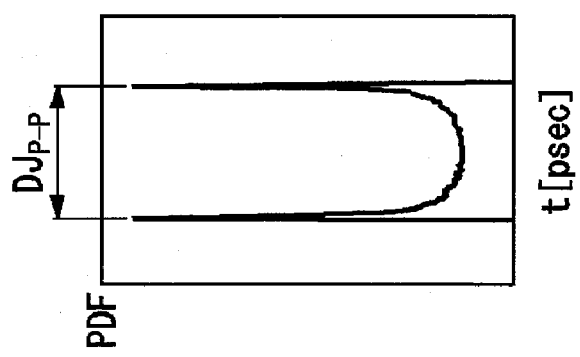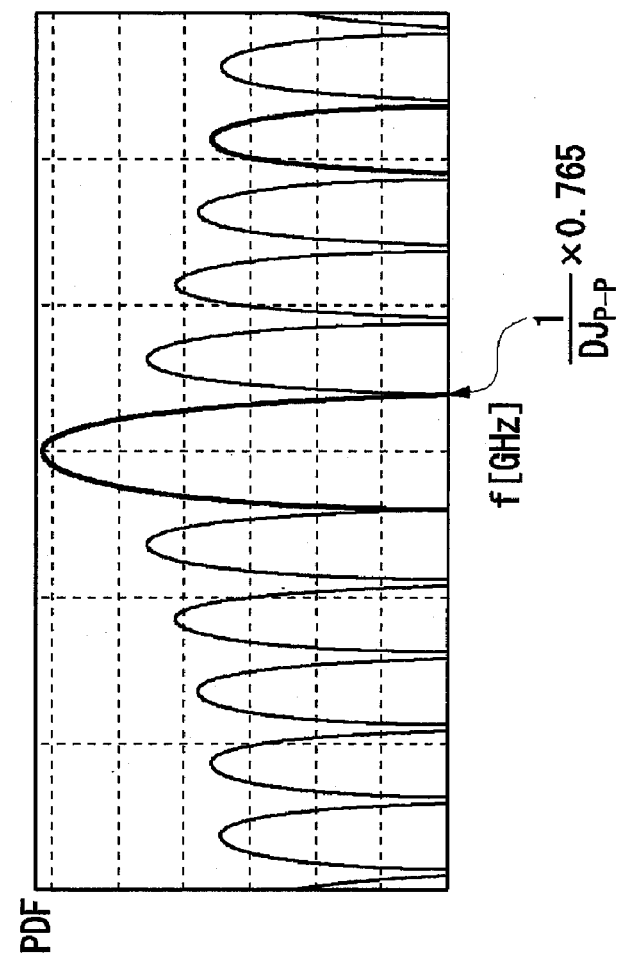
FIG. 5A

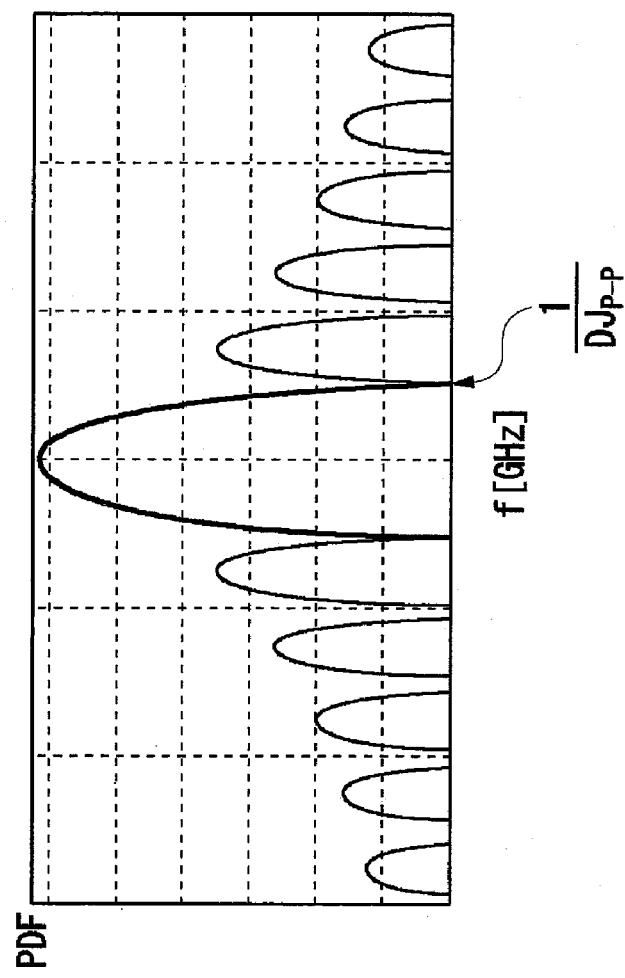
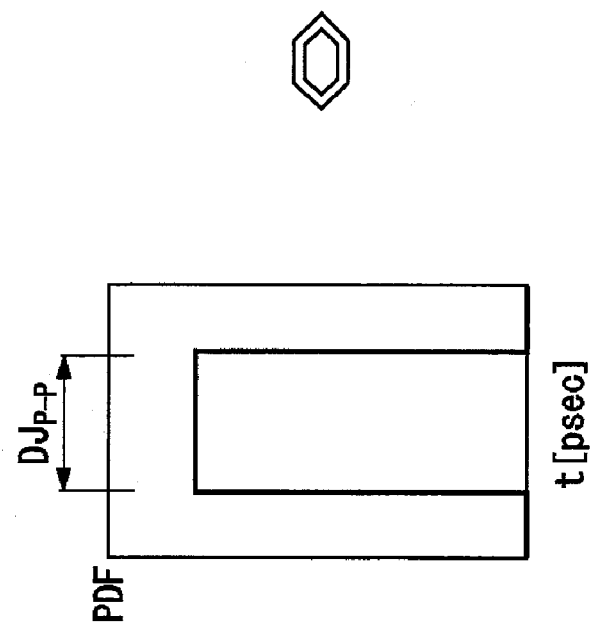
FIG. 5B

| TYPE OF DETERMINISTIC COMPONENT | PROBABILITY DENSITY FUNCTION OF THE DETERMINISTIC COMPONENT | | NULL FREQUENCY $f_{zero}$ | $\dfrac{DJ_{RMS}}{DJ_{P-P}}$ |
|---|---|---|---|---|
| | TIME DOMAIN d(t) | FREQUENCY DOMAIN D(f) | | |
| SINUSOIDAL DISTRIBUTION | $\dfrac{2}{\pi\sqrt{DJ_{P-P}^2 - 4t^2}}$ | $I_0(\pi \cdot DJ_{P-P} \cdot f)$ | $\dfrac{0.765}{DJ_{P-P}}$ | $\dfrac{1}{2\sqrt{2}}$ |
| TRAPEZOIDAL DISTRIBUTION | $\cdot \alpha \cdot DJ_{P-P}/2 < \|t\| < DJ_{P-P}/2$ $\dfrac{2}{DJ_{P-P}^2(1-\alpha^2)}$ $\cdot \alpha \cdot DJ_{P-P}/2 > \|t\|$ $\dfrac{2}{DJ_{P-P}(1+\alpha)}$ | $\mathrm{sinc}\left(\dfrac{(1+\alpha)}{2} \cdot DJ_{P-P} \cdot f\right) \cdot \mathrm{sinc}\left(\dfrac{(1-\alpha)}{2} \cdot DJ_{P-P} \cdot f\right)$ | $\dfrac{2}{(1+\alpha) \cdot DJ_{P-P}}$ | $\sqrt{\dfrac{1+\alpha^2}{24}}$ |
| DUAL DIRAC DISTRIBUTION | $\dfrac{\delta\left(t+\dfrac{DJ_{P-P}}{2}\right) + \delta\left(t-\dfrac{DJ_{P-P}}{2}\right)}{2}$ | $\cos(\pi \cdot DJ_{P-P} \cdot f)$ | $\dfrac{1}{2 \cdot DJ_{P-P}}$ | $\dfrac{1}{2}$ |
| DIRAC DISTRIBUTION | $\delta(t)$ | Constant, 1 | No null frequency | undefined $(DJ_{RMS}=0, DJ_{P-P}=0)$ |

*FIG. 7*

DETERMINISTIC COMPONENT MODEL JUDGING APPARATUS, JUDGING METHOD, PROGRAM, RECORDING MEDIUM, TEST SYSTEM AND ELECTRONIC DEVICE

BACKGROUND

1. Technical Field

The present invention relates to a deterministic component model determining apparatus, a determining method, a program, a recording medium, a test system, and an electronic device.

2. Related Art

Electronic circuits, communication systems, and the like are conventionally tested by measuring characteristic values of an electric signal. For example, serial transmission evaluation involves evaluating a communication system by measuring jitter in a transmission signal or a reception signal.

The characteristic value of the jitter includes (i) a deterministic component caused deterministically by characteristics such as the signal pattern and the transmission path and (ii) a random component occurring randomly. In a more thorough evaluation, it is desirable to evaluate the deterministic component and the random component separately.

When measuring the deterministic component and the random component, a characteristic value is measured several times to obtain a probability density function. The probability density function can be thought of as a convolution of the deterministic component and the random component, and therefore the deterministic component and the random component can be separated by deconvoluting the deterministic component from the probability density function, as shown in, for example, International Publication Pamphlet No. 2007/108492.

The invention disclosed in the above pamphlet calculates the deterministic component based on a first null frequency in the spectrum of the probability density function. At this time, the model of the deterministic component included in the probability density function is already known. But since there are several types of models for the deterministic component, the deterministic component cannot be calculated accurately unless an accurate model is determined for the deterministic component in the probability density function.

SUMMARY

Therefore, it is an object of an aspect of the innovations herein to provide a deterministic component model determining apparatus, a determining method, a program, a storage medium, a test system, and an electronic device, which are capable of overcoming the above drawbacks accompanying the related art. The above and other objects can be achieved by combinations described in the independent claims. The dependent claims define further advantageous and exemplary combinations of the innovations herein.

According to a first aspect related to the innovations herein, one exemplary deterministic component model determining apparatus may include a deterministic component model determining apparatus that determines a type of a deterministic component included in a probability density function supplied thereto, comprising a standard deviation calculating section that calculates a standard deviation of the probability density function; a spectrum calculating section that calculates a spectrum of the probability density function; a null frequency detecting section that detects a null frequency of the spectrum; a theoretical value calculating section that calculates a theoretical value of a spectrum for each of a plurality of predetermined types of deterministic components, based on the null frequency detected by the null frequency detecting section; a measured value calculating section that calculates a measured value of the spectrum for the deterministic component included in the probability density function, based on the standard deviation calculated by the standard deviation calculating section and the spectrum calculated by the spectrum calculating section; and a model determining section that determines the type of the deterministic component included in the probability density function to be the type of deterministic component corresponding to a theoretical value closest to the measured value calculated by the measured value calculating section, from among the theoretical values calculated by the theoretical value calculating section for the plurality of types of deterministic components.

According to a second aspect related to the innovations herein, one exemplary determining method may include a method for determining a type of a deterministic component included in a supplied probability density function, comprising calculating a standard deviation of the probability density function; calculating a spectrum of the probability density function; detecting a null frequency of the spectrum; calculating a theoretical value of a spectrum for each of a plurality of predetermined types of deterministic components, based on the null frequency; calculating a measured value of the spectrum for the deterministic component included in the probability density function, based on the standard deviation and the spectrum; and determining the type of the deterministic component included in the probability density function to be the type of deterministic component corresponding to a theoretical value closest to the measured value from among the theoretical values calculated for the plurality of types of deterministic components According to a third aspect related to the innovations herein, one exemplary computer readable medium may include a computer readable medium storing thereon a program causing a computer to function as a deterministic component model determining apparatus that determines a type of a deterministic component included in a probability density function supplied thereto, the computer being caused to function as a standard deviation calculating section that calculates a standard deviation of the probability density function; a spectrum calculating section that calculates a spectrum of the probability density function; a null frequency detecting section that detects a null frequency of the spectrum; a theoretical value calculating section that calculates a theoretical value of a spectrum for each of a plurality of predetermined types of deterministic components, based on the null frequency detected by the null frequency detecting section; a measured value calculating section that calculates a measured value of the spectrum for the deterministic component included in the probability density function, based on the standard deviation calculated by the standard deviation calculating section and the spectrum calculated by the spectrum calculating section; and a model determining section that determines the type of the deterministic component included in the probability density function to be the type of deterministic component corresponding to a theoretical value closest to the measured value calculated by the measured value calculating section from among the theoretical values calculated by the theoretical value calculating section for the plurality of types of deterministic components.

According to a fourth aspect related to the innovations herein, one exemplary test system may include a test system that tests a device under test, comprising a measuring section that measures a prescribed characteristic of the device under test a plurality of times; a deterministic component model determining apparatus that determines a type of a deterministic component included in a probability density function of characteristic values measured by the measuring section and calculates the deterministic component of the probability density function; and an acceptability judging section that judges acceptability of the device under test based on the deterministic component calculated by the deterministic component model determining apparatus The deterministic component model determining apparatus includes a standard deviation calculating section that calculates a standard deviation of the probability density function; a spectrum calculating section that calculates a spectrum of the probability density function; a null frequency detecting section that detects a null frequency of the spectrum; a theoretical value calculating section that calculates a theoretical value of a spectrum for each of a plurality of predetermined types of deterministic components, based on the null frequency detected by the null frequency detecting section; a measured value calculating section that calculates a measured value of the spectrum for the deterministic component included in the probability density function, based on the standard deviation calculated by the standard deviation calculating section and the spectrum calculated by the spectrum calculating section; a model determining section that determines the type of the deterministic component included in the probability density function to be the type of deterministic component corresponding to a theoretical value closest to the measured value calculated by the measured value calculating section from among the theoretical values calculated by the theoretical value calculating section for the plurality of types of deterministic components; and a deterministic component calculating section that calculates the deterministic component included in the probability density function, based on the type of the deterministic component determined by the deterministic component model determining apparatus and the null frequency detected by the null frequency detecting section.

According to a fifth aspect related to the innovations herein, one exemplary electronic device may include an electronic device that generates a prescribed signal, comprising an operation circuit that generates and outputs the prescribed signal; a measuring section that measures a prescribed characteristic of the prescribed signal a plurality of times; and a deterministic component model determining apparatus that determines a type of a deterministic component included in a probability density function of characteristic values measured by the measuring section and calculates the deterministic component of the probability density function. The deterministic component model determining apparatus includes a standard deviation calculating section that calculates a standard deviation of the probability density function; a spectrum calculating section that calculates a spectrum of the probability density function; a null frequency detecting section that detects a null frequency of the spectrum; a theoretical value calculating section that calculates a theoretical value of a spectrum for each of a plurality of predetermined types of deterministic components, based on the null frequency detected by the null frequency detecting section; a measured value calculating section that calculates a measured value of the spectrum for the deterministic component included in the probability density function, based on the standard deviation calculated by the standard deviation calculating section and the spectrum calculated by the spectrum calculating section; and a model determining section that determines the type of the deterministic component included in the probability density function to be the type of deterministic component corresponding to a theoretical value closest to the measured value calculated by the measured value calculating section from among the theoretical values calculated by the theoretical value calculating section for the plurality of types of deterministic components.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 5A shows the probability density function and the spectrum of a deterministic component following a sinusoidal distribution model; and FIG. 5B shows the probability density function and the spectrum of a deterministic component following a uniform distribution model.

FIG. 7 s a chart showing a time domain model, a frequency domain model, a relation between the first null frequency $f_{zero}$ and the peak-to-peak value $DJ_{P-P}$, and the relationship between the peak-to-peak value $DJ_{P-P}$ and a root mean squared value $DJ_{RMS}$, for each type of deterministic component.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
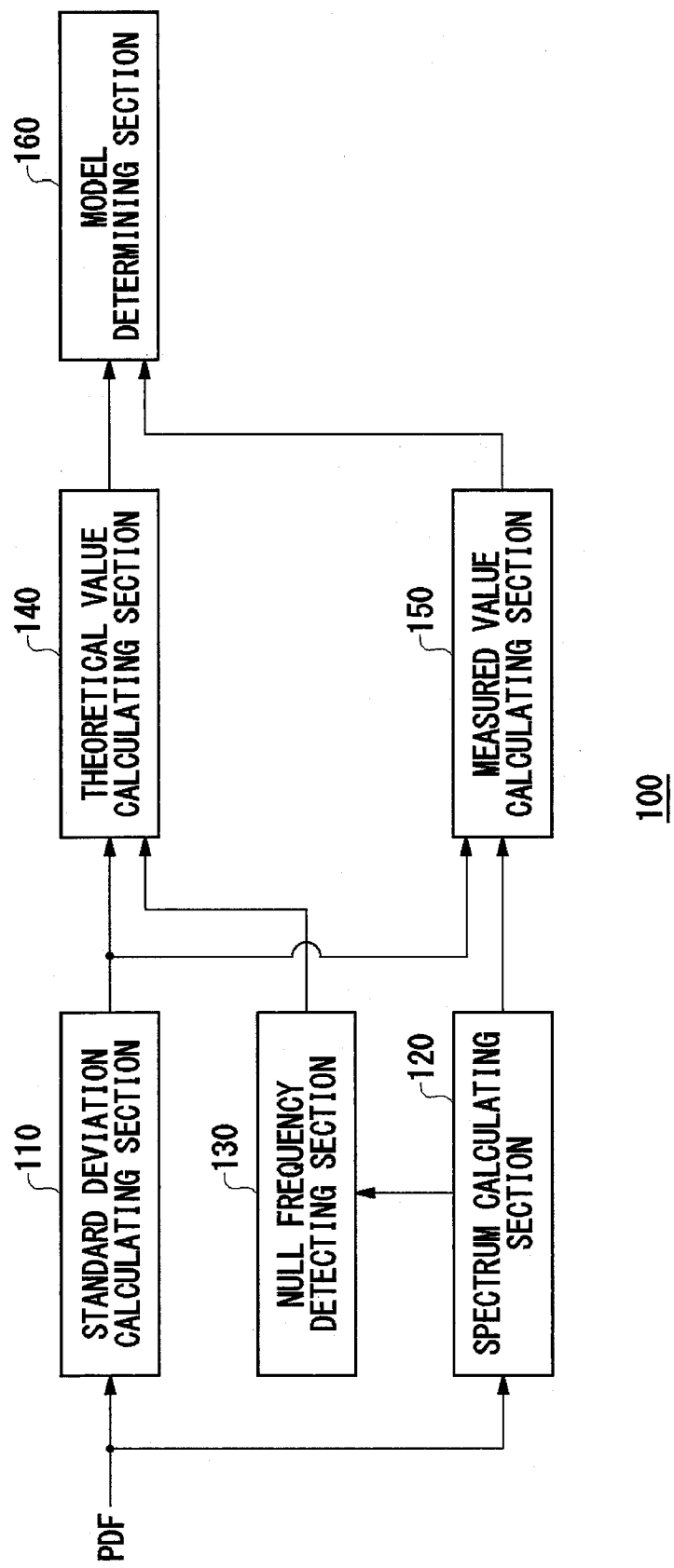
FIG. 1 shows an exemplary functional configuration of a deterministic component model determining apparatus 100 according to an embodiment of the present invention.

FIG. 1 shows an exemplary functional configuration of a deterministic component model determining apparatus 100 according to an embodiment of the present invention. The deterministic component model determining apparatus 100 determines the type or the model of a deterministic component included in a probability density function supplied thereto. The deterministic component model determining apparatus 100 includes a standard deviation calculating section 110, a spectrum calculating section 120, a null frequency detecting section 130, a theoretical value calculating section 140, a measured value calculating section 150, and a model determining section 160.

First, a probability density function, a deterministic component, and a random component will be described. If the deterministic component and the random component, which are included in the probability density function, are independent from each other, the probability density function on the time axis can be calculated as a convolution of the deterministic component and the random component on the time axis. Therefore, the spectrum H(f) of the probability density function can be calculated as a product of the deterministic component spectrum D(f) and the random component spectrum R(f), as shown below.

$$H(f)=D(f) \cdot R(f)$$

The random component usually follows a Gaussian distribution, and therefore the spectrum R(f) can be found using the expression below.

$$R(f)=\exp(-2\pi^2 \sigma^2_{RJ,RMS} f^2)$$

Here, $\sigma_{RJ,RMS}$ represents the standard deviation of the random component. Therefore, the random component can be determined if the standard deviation of the random component can be measured. The deterministic component can then be determined by subtracting the random component from the provided probability density function.

The provided probability density function, however, includes the deterministic component and the random component, and therefore it is difficult to measure the standard deviation of only the random component from the probability density function. But if the deterministic component and the random component are independent from each other, the standard deviation $\sigma_{TJ,RMS}$ of the probability density function can be calculated from the standard deviation $\sigma_{RJ,RMS}$ of the random component and the standard deviation $DJ_{RMS}$ of the deterministic component, as shown by the expression below.

$$\sigma_{TJ,RMS}^2 = \sigma_{RJ,RMS}^2 + DJ_{RMS}^2$$

Accordingly, the spectrum of the probability density function can be calculated by Expression 1 below $$H(f)=D(f) \cdot \exp(-2\pi^2 \sigma_{TJ,RMS}^2 f^2) \cdot \exp(-2\pi^2 DJ_{RMS}^2 f^2) \quad \text{Expression 1:}$$

The standard deviation $DJ_{RMS}$ of the deterministic component can be calculated from the peak-to-peak value $DJ_{P-P}$ of the deterministic component. In other words, Expression 1 can be used to separate the deterministic component D(f) from the probability density function H(f) if the standard deviation $\sigma_{TJ,RMS}$ of the probability density function and the peak-to-peak value $DJ_{P-P}$ of the deterministic component can be measured.

The standard deviation calculating section 110 calculates the standard deviation $\sigma_{RJ,RMS}$ of the provided probability density function. The standard deviation calculating section 110 may calculate the standard deviation $\sigma_{TJ,RMS}$ of the probability density function on the time axis using Expression 2.

$$\sigma_{TJ,RMS} = \sqrt{\sum_{k=1}^{N} p_k (x_k - \mu)^2} \quad \text{Expression 2:}$$

Here, $x_i$ is the central value of the i-th bin of the provided probability density function, $y_i$ is the number of events of the i-th bin, and N is the total number of bins. Furthermore, $p_i$ and $\mu$ are provided below.

$$p_i = \frac{y_i}{\sum_{k=1}^{N} y_k},$$

$$\mu = \sum_{k=1}^{N} p_k x_k$$

The spectrum calculating section 120 outputs a spectrum of the provided probability density function. The standard deviation calculating section 110 and the spectrum calculating section 120 may be provided, in parallel, with the probability density function on the time axis.

The null frequency detecting section 130 detects a null frequency of the spectrum calculated by the spectrum calculating section 120. The null frequency is a frequency at which the power of the spectrum is substantially zero or a very small value. As described above, the peak-to-peak value $DJ_{P-P}$ of the deterministic component can be calculated from the null frequency of the spectrum of the probability density function.

Figure 2:
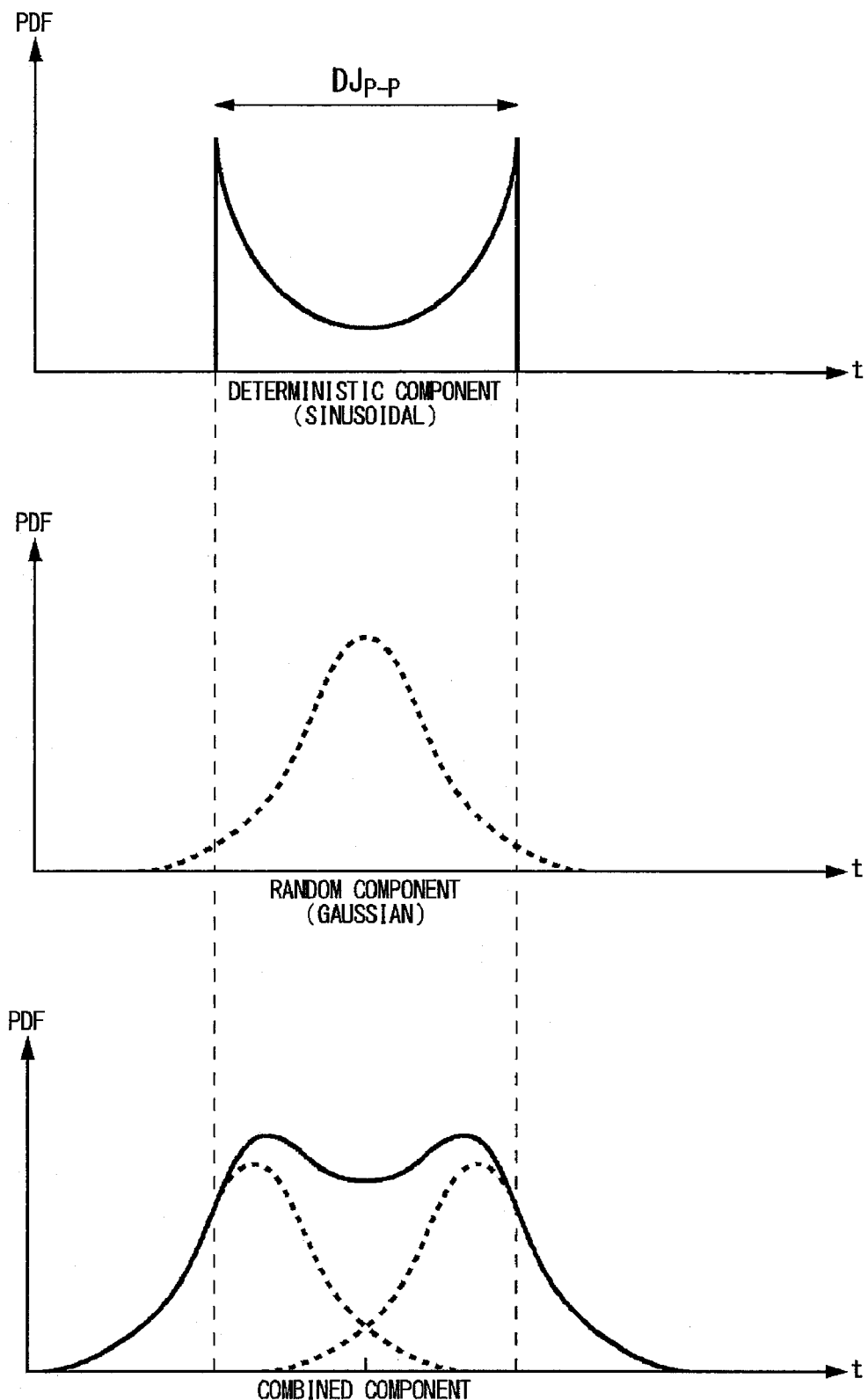
FIG. 2 shows an exemplary probability density function provided to the deterministic component model determining apparatus 100.

FIG. 2 shows an exemplary probability density function provided to the deterministic component model determining apparatus 100. The probability density function may show a distribution of measured values obtained by measuring a prescribed characteristic of an electronic circuit several times. The prescribed characteristic may be a jitter amount, an amplitude value, or a DC value of a signal output by an electronic circuit or an optical circuit, for example.

For example, the jitter amount may show the phase noise of the signal. More specifically, the jitter amount may indicate a difference between the edge timing of the signal and an ideal edge timing. In this case, the probability density function may represent the measured value distribution, i.e. the occurrence rate, when the jitter value of each edge of the signal is measured. The amplitude value may represent the amplitude of voltage, current, optical intensity, or the like of the signal. The DC current value may represent the DC level of voltage, current, optical intensity, or the like of the signal.

Generally, the probability density function of such characteristics includes a deterministic component and a random component. For example, the probability density function of the jitter amount includes a random component that occurs randomly and a deterministic component that occurs periodically due to the characteristics or the like of the transmission line.

The random component of the probability density function follows a Gaussian distribution, as shown in FIG. 2. The deterministic component follows a variety of different models depending on what causes the deterministic component. In FIG. 2, for example, the model of the deterministic component is a sinusoidal distribution, but may instead be a uniform distribution, a trapezoidal distribution, a dual Dirac distribution, a single Dirac distribution, or the like.

Figure 3A:
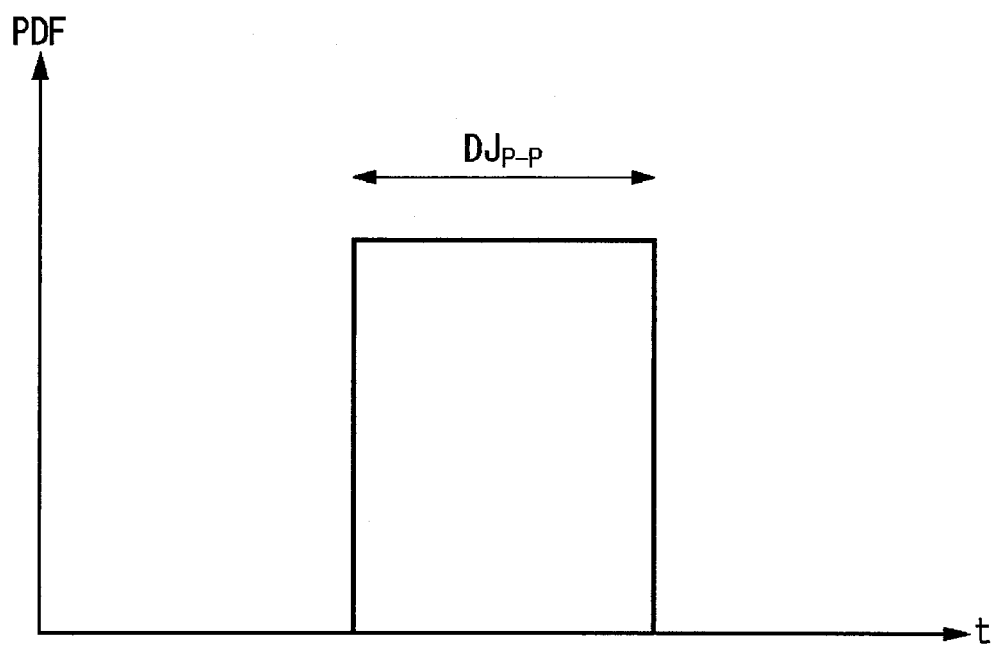
FIG. 3A shows a probability density function of a deterministic component following a uniform distribution.
Figure 3B:
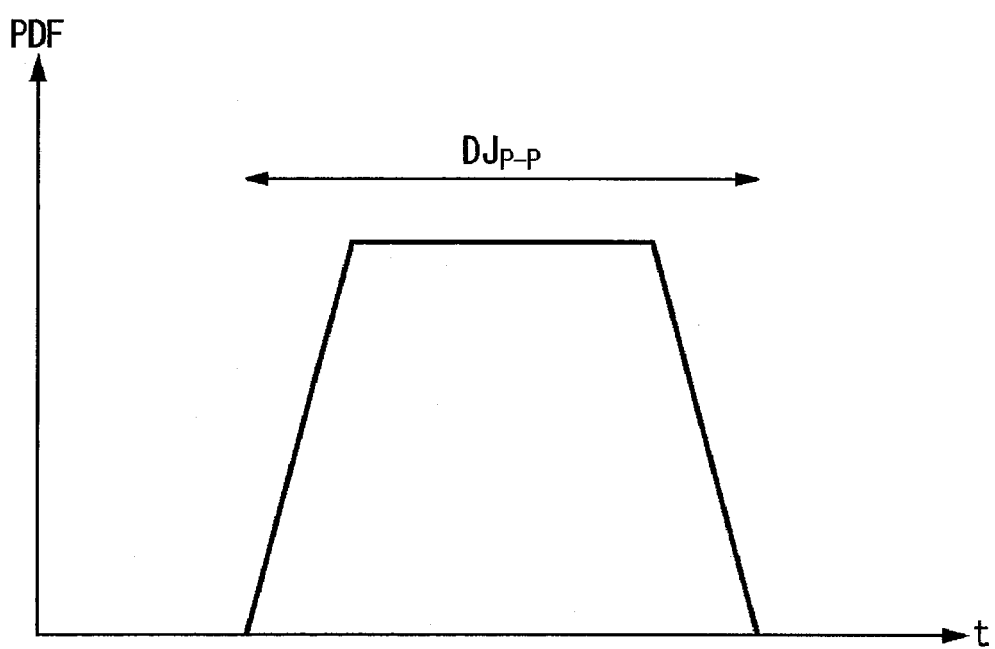
FIG. 3B shows a probability density function of a deterministic component following a trapezoidal distribution.
Figure 4A:
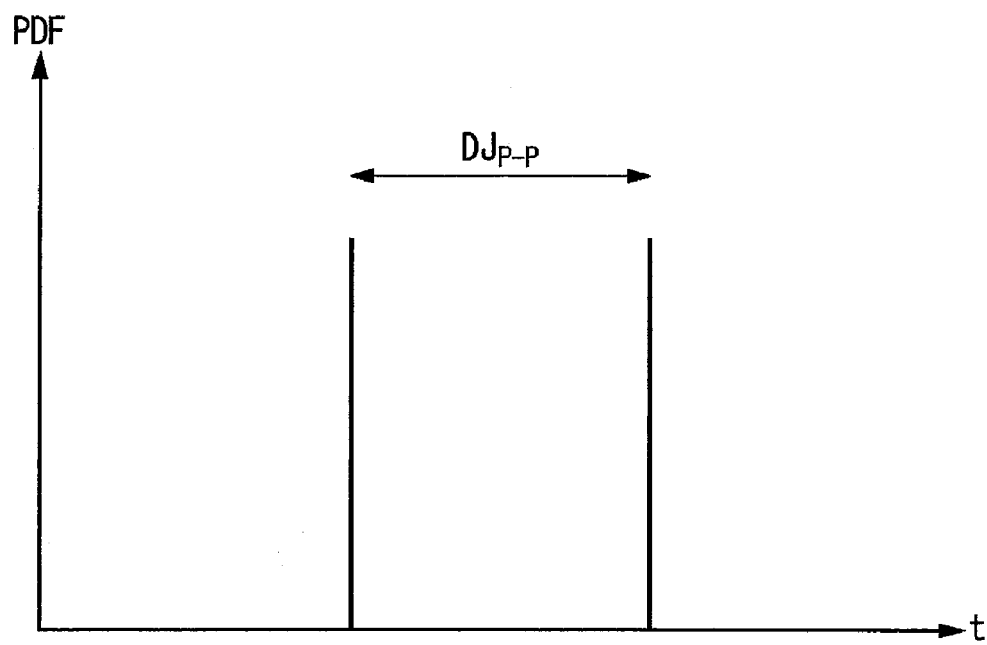
FIG. 4A shows a probability density function of a deterministic component following a dual Dirac distribution.
Figure 4B:
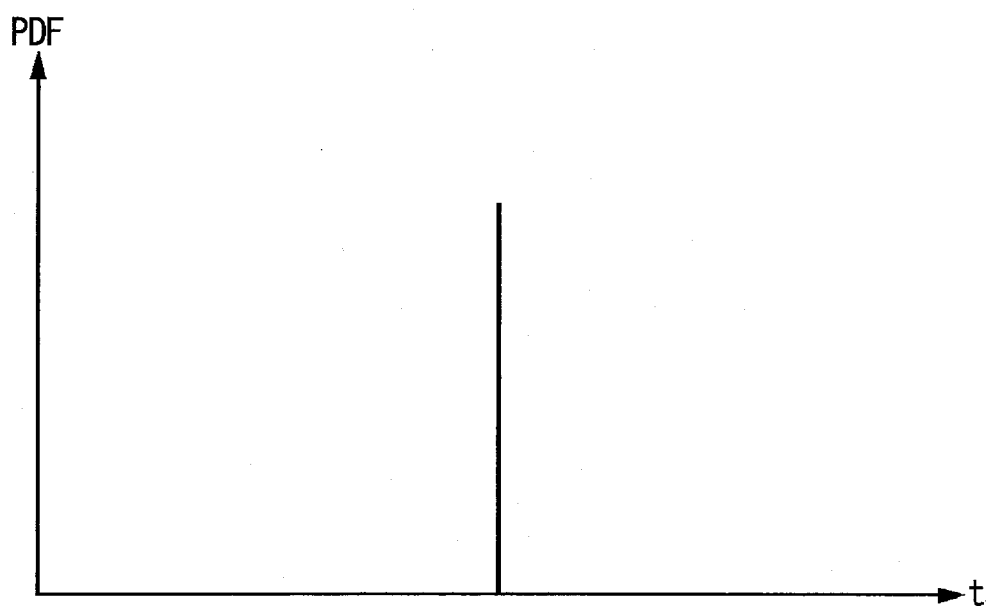
FIG. 4B shows a probability density function of a deterministic component following a single Dirac distribution.

FIGS. 3A, 3B, 4A, and 4B show probability density function having deterministic components following various models. FIG. 3A shows a deterministic component following a uniform distribution. FIG. 3B shows a deterministic component following a trapezoidal distribution. FIG. 4A shows a deterministic component following a dual Dirac distribution. FIG. 4B shows a deterministic component following a single Dirac distribution.

As shown in FIGS. 2 to 4B, the distribution of the deterministic component can be determined for a certainty if the peak-to-peak value $DJ_{P-P}$ is determined in the corresponding model. Here, it is desirable that a ratio between an upper portion and a lower portion be further provided for the deterministic portion following the trapezoidal distribution. Furthermore, the deterministic component following the single Dirac distribution is provided as a deterministic component with a peak-to-peak value of substantially zero.

The deterministic component model determining apparatus 100 of the present embodiment calculates the peak-to-peak value $DJ_{P-P}$ of the deterministic component based on the null frequency of the spectrum of the probability density function. The following describes an example in which the smallest frequency among the null frequencies of the spectrum is used as a first null frequency.

FIGS. 5A and 5B show the probability density function and the spectrum of deterministic components following prescribed models. FIG. 5A shows the probability density function and the spectrum of a deterministic component following a sinusoidal distribution model. FIG. 5B shows the probability density function and the spectrum of a deterministic component following a uniform distribution model. In FIGS. 5A and 5B, the waveform on the left represents the probability density function in the time domain, and the waveform on the right represents the spectrum of the probability density function. Furthermore, $DJ_{P-P}$ represents the peak-to-peak value of the deterministic component in the time domain.

As shown in FIG. 5A, the first null frequency of the spectrum obtained by Fourier transforming the probability density function of the deterministic component following the sinusoidal distribution is calculated as $0.765/DJ_{P-P}$. In other words, the peak-to-peak value $DJ_{P-P}$ of the deterministic component can be calculated by multiplying the inverse of the first null frequency by the coefficient 0.765. It should be noted that this coefficient is an approximate value, and more or less accurate values may be used instead, such as coefficients accurate to more or fewer decimals.

As shown in FIG. 5B, the first null frequency of the spectrum obtained by Fourier transforming the probability density function of the deterministic component following the uniform distribution is calculated as $1/DJ_{P-P}$. In other words, the peak-to-peak value $DJ_{P-P}$ of the deterministic component can be calculated as the inverse of the first null frequency.

The peak-to-peak values of the deterministic components following other distributions, e.g. the trapezoidal distribution and the single Dirac distribution, can be calculated from the first null frequency in the same way. However, it is necessary to determine the model in order to accurately calculate the deterministic component, since the relationship between the first null frequency and the peak-to-peak value $DJ_{P-P}$ is different depending on the deterministic component model, as shown in FIGS. 5A and 5B.

Figure 6:
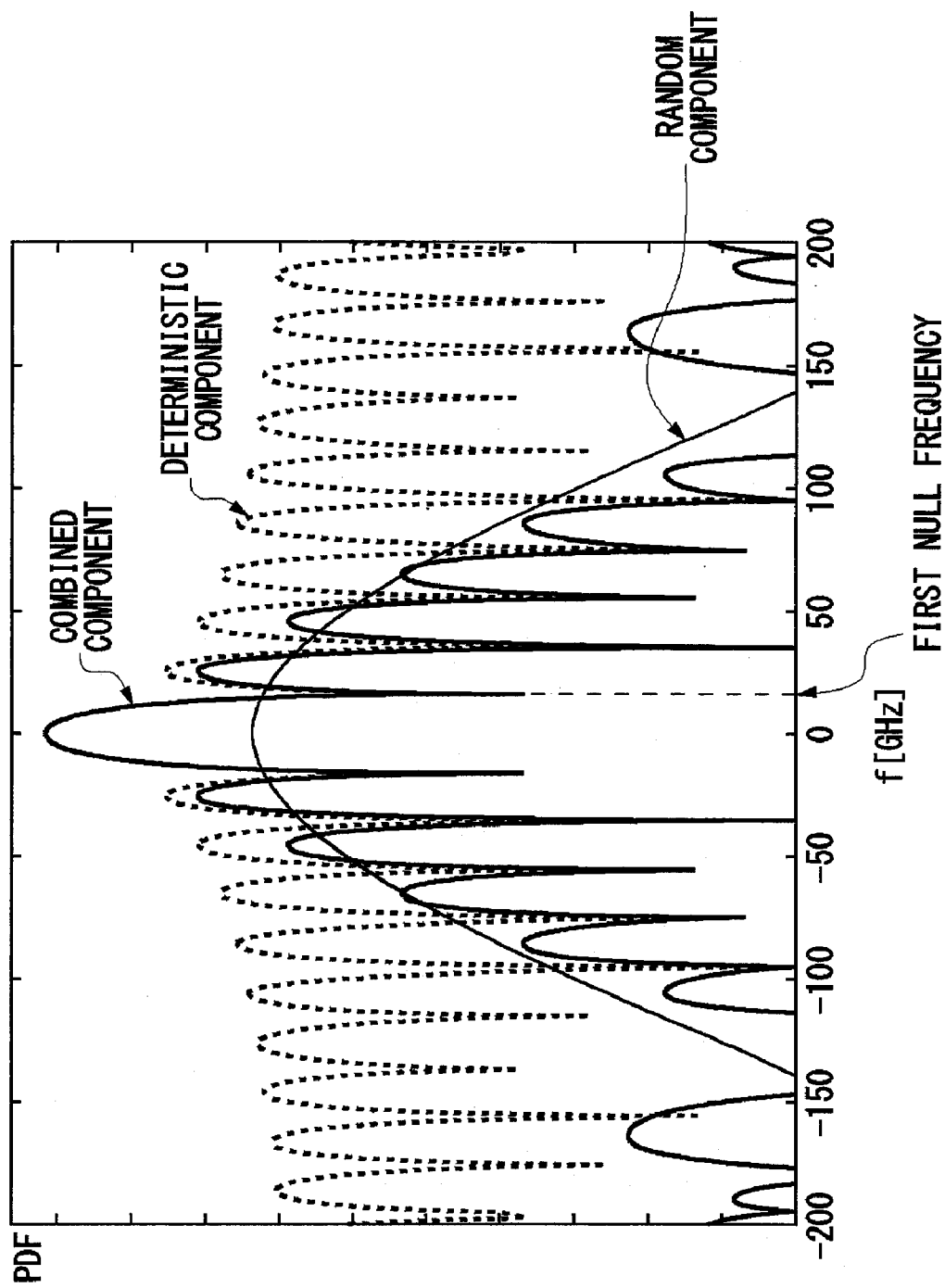
FIG. 6 shows an exemplary spectrum calculated by the spectrum calculating section 120.

FIG. 6 shows an exemplary spectrum calculated by the spectrum calculating section 120. The spectrum calculating section 120 calculates the spectrum of the provided probability density function. The spectrum calculating section 120 may calculate the spectrum by Fourier transforming the provided probability density function. The spectrum calculated by the spectrum calculating section 120 includes a spectrum of the deterministic component and a spectrum of the random component, as shown in FIG. 6.

The null frequency detecting section 130 detects the null frequency of the spectrum calculated by the spectrum calculating section 120. The null frequency detecting section 130 of the present embodiment detects the first null frequency, which is the smallest frequency from among the null frequencies of the spectrum.

In the manner described above, the first null frequency of the spectrum of the deterministic component corresponds to the peak-to-peak value of the deterministic component on the time axis. As shown in FIG. 6, the first null frequency of the combined spectrum of the deterministic component and the random component is almost identical to the first null frequency of the spectrum of the deterministic component.

Therefore, the first null frequency of the spectrum of the deterministic component can be detected by detecting the first null frequency of the spectrum of the provided probability density function. As described above, the peak-to-peak value $DJ_{P-P}$ of the deterministic component can be calculated from the first null frequency of the spectrum of the deterministic component. It should be noted that the calculated peak-to-peak value $DJ_{P-P}$ is different for each type of deterministic component.

FIG. 7 is a chart showing a time domain model, a frequency domain model, a relation between the first null frequency $f_{zero}$ and the peak-to-peak value $DJ_{P-P}$, and the relationship between the peak-to-peak value $DJ_{P-P}$ and a root mean squared value $DJ_{RMS}$, for each type of deterministic component. In FIG. 7, $I_0$ represents a Bessel function of the first kind with an order of 0.

In FIG. 7, $\alpha$ represents the ratio of the upper portion to the lower portion in the trapezoidal distribution. In other words, $\alpha=1$ corresponds to a uniform distribution, and $\alpha=0$ corresponds to a triangular distribution. The types of deterministic components that can be handled by the deterministic component model determining apparatus 100 are not limited to the types described above. The deterministic component model determining apparatus 100 may determine models for any deterministic component whose peak-to-peak value can be calculated from the first null frequency of the spectrum.

Here, the model for each type of deterministic component spectrum is expressed by the first null frequency $f_{zero}$ and the standard deviation $\sigma_{TJ,RMS}$ that can be calculated from the provided probability density function. The model for the spectrum of a deterministic component following a sinusoidal distribution is obtained from Expression 1 and FIG. 7, and is shown below in Expression 3.

$$H_{sin}(f) = I_0\left(0.765\pi \cdot \frac{f}{f_{zero}}\right) \cdot$$

$$\exp\left(\frac{0.765^2 \pi^2}{4} \cdot \frac{f^2}{f_{zero}^2}\right) \cdot \exp(-2\pi^2 f^2 \sigma_{TJ,RMS}^2)$$

Expression 3:

The model for the spectrum of a deterministic component following a trapezoidal distribution is provided in Expression 4.

$$H_{Tra}(f, \alpha) = \mathrm{sinc}\left(\frac{f}{f_{zero}}\right) \cdot \mathrm{sinc}\left(\frac{1-\alpha}{1+\alpha} \cdot \frac{f}{f_{zero}}\right) \cdot$$

$$\exp\left(\frac{\pi^2(1+\alpha^2)}{3(1+\alpha)^2} \cdot \frac{f^2}{f_{zero}^2}\right) \cdot \exp(-2\pi^2 f^2 \sigma_{TJ,RMS}^2)$$

Expression 4:

The model for the spectrum of a deterministic component following a dual Dirac distribution is provided in Expression 5.

$$H_{DD}(f) = \cos\left(\frac{\pi}{2} \cdot \frac{f}{f_{zero}}\right) \cdot \exp\left(\frac{\pi^2}{8} \cdot \frac{f^2}{f_{zero}^2}\right) \cdot \exp(-2\pi^2 f^2 \sigma_{TJ,RMS}^2)$$

Expression 5:

The model for the spectrum of a deterministic component following a single Dirac distribution is provided in Expression 6.

$$H_{Dirac}(f) = \exp(-2\pi^2 f^2 \sigma_{TJ,RMS}^2)$$

Expression 6:

The theoretical value calculating section 140 calculates theoretical values of the spectrum of each of a plurality of types of predetermined deterministic components, based on the standard deviation $\sigma_{TJ,RMS}$ calculated by the standard deviation calculating section 110 and the first null frequency $f_{zero}$ detected by the null frequency detecting section 130. For example, the theoretical value calculating section 140 calculates the theoretical values of each type of deterministic component based on Expressions 3 to 6. The theoretical value calculating section 140 may be provided in advance with Expressions 3 to 6.

The theoretical value calculating section 140 may instead calculate the theoretical values of the spectrums normalized by a Gaussian distribution spectrum having the standard deviation $\sigma_{TJ,RMS}$ calculated by the standard deviation calculating section 110. For example, the theoretical value calculating section 140 may calculate Y(x) in Expressions 3 to 6 using Expression 7.

$$Y(x) = H(x)/\exp(-2\pi^2 f^2 \sigma_{TJ,RMS}^2)$$

Expression 7:

The theoretical value calculating section 140 may instead calculate the theoretical values of the spectrums having a frequency f normalized with the first null frequency $f_{zero}$. For example, the theoretical value calculating section 140 may calculate the theoretical values in Expressions 3 to 6 with $x = f/f_{zero}$.

When such normalizations are performed, Expressions 3 to 6 transform into the Expressions below.

$$Y_{sin}(x) = I_0(0.765\pi \cdot x) \cdot \exp\left(\frac{0.765^2 \pi^2}{4} \cdot x^2\right)$$

Expression 3':

$$Y_{Tra}(x, \alpha) = \mathrm{sinc}(x) \cdot \mathrm{sinc}\left(\frac{1-\alpha}{1+\alpha} \cdot x^2\right) \cdot \exp\left(\frac{\pi^2(1+\alpha^2)}{3(1+\alpha)^2} \cdot x^2\right)$$

Expression 4':

$$Y_{DD}(x) = \cos\left(\frac{\pi}{2} \cdot x\right) \cdot \exp\left(\frac{\pi^2}{8} \cdot x^2\right)$$

Expression 5':

$$Y_{Dirac}(x) = 1$$

Expression 6':

The theoretical value calculating section 140 may be provided in advance with Expressions 3' to 6'. In this case, the theoretical value calculating section 140 may calculate the theoretical values of the spectrums of the various typed of deterministic components by substituting the first null frequency detected by the null frequency detecting section 130 into Expressions 3' to 6'.

The measured value calculating section 150 calculates measured values of the deterministic component spectrum in the probability density function PDF, based on the standard deviation $\sigma_{TJ,RMS}$ calculated by the standard deviation calculating section 110 and the spectrum calculated by the spectrum calculating section 120. The measured value calculating section 150 may use the spectrum H(x) obtained by normalizing the frequency of the spectrum H(f) calculated by the spectrum calculating section 120 with the first null frequency $f_{zero}$.

The measured value calculating section 150 may calculate the measured values of the deterministic component spectrum by dividing the spectrum H(x) by a Gaussian distribution spectrum having the standard deviation $\sigma_{TJ,RMS}$. In this case, the measured values of the deterministic component spectrum Y(x), shown below, can be obtained from Expression 7.

$$Y(x) = H(x)/\exp(-2\pi^2 f_{zero}^2 \sigma_{TJ,RMS}^2)$$

Figure 8:
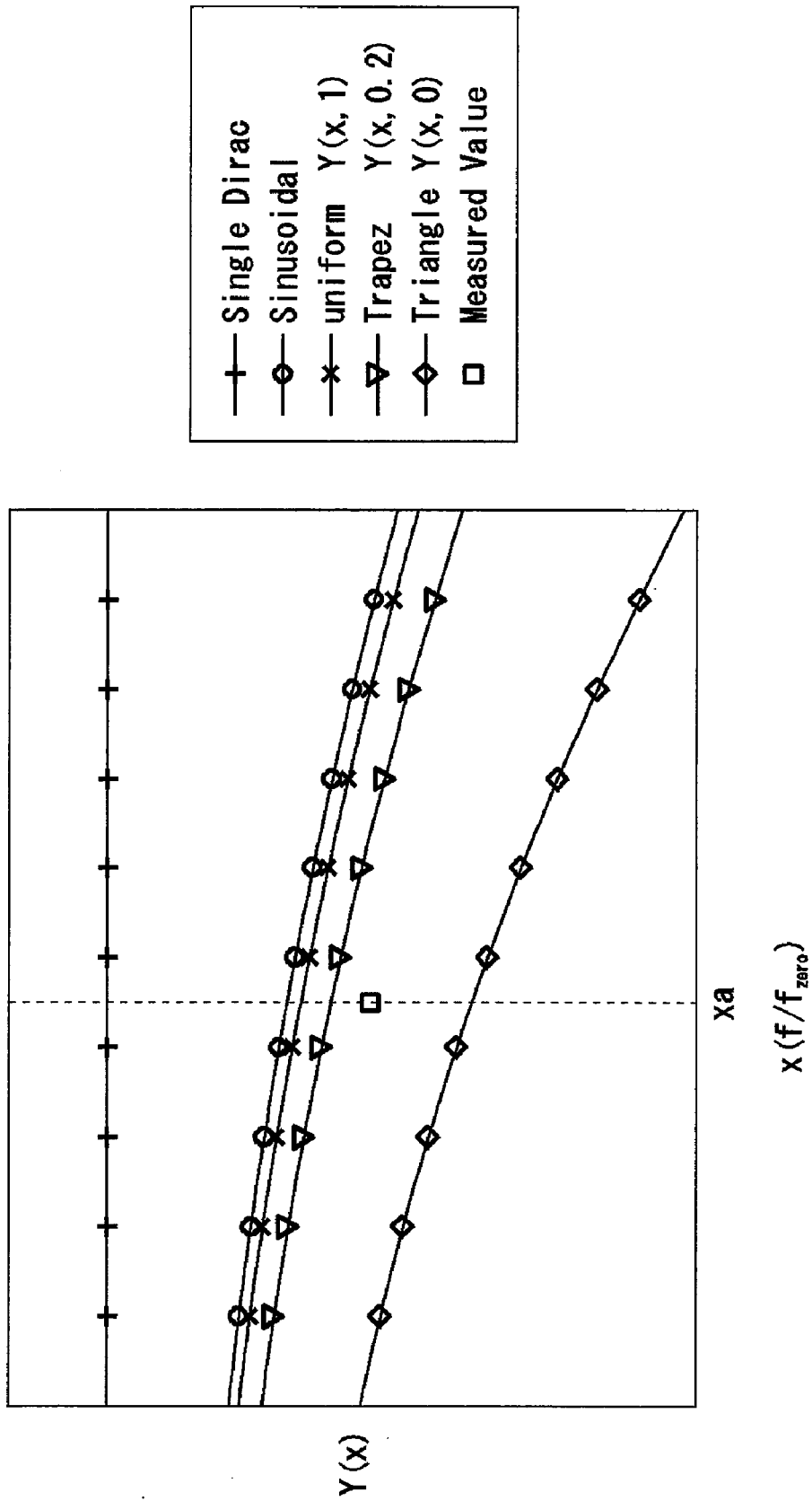
FIG. 8 shows examples of theoretical values of various types of deterministic component spectrums Y(x) calculated by the theoretical value calculating section 140 and a measured value of the deterministic component spectrum Y(x) calculated by the measured value calculating section 150.

FIG. 8 shows examples of theoretical values of various types of deterministic component spectrums Y(x) calculated by the theoretical value calculating section 140 and a measured value of the deterministic component spectrum Y(x) calculated by the measured value calculating section 150. As shown in FIG. 8, the following relationship is seen within a range of 0<x<1.

$$Y_{Dirac}(x) > Y_{DD}(x) > Y_{sin}(x) > Y_{Tra}(x, \alpha)$$

The larger the value of α, which is the ratio of the top portion to the bottom portion the trapezoidal distribution, the larger the value of $Y_{Tra}(x,\alpha)$, as shown in the Expression below.

$$Y_{Tra}(x,1) > Y_{Tra}(x,0.5) > Y_{Tra}(x,0.2) > Y_{Tra}(x,0)$$

The model determining section 160 determines the type of deterministic component included in the probability density function to be the type corresponding to the theoretical values closest to the measured values calculated by the measured value calculating section 150, from among the theoretical values calculated by the theoretical value calculating section 140 for each type of deterministic component. The theoretical value calculating section 140 and the measured value calculating section 150 may calculate value of the spectrum at the same predetermined frequency, e.g. the frequency $f/f_{zero} = xa$ in FIG. 8, as the theoretical value and the measured value.

In other words, the theoretical value calculating section 140 and the measured value calculating section 150 need not calculate the theoretical values and the measured values of the spectrum across all of the regions. It is, however, desirable that the theoretical value calculating section 140 and the measured value calculating section 150 calculate the value of the spectrum within a frequency range between 0 and the first null frequency. In other words, it is desirable that the theoretical value calculating section 140 and the measured value calculating section 150 calculate the value of the spectrum in a range of 0<xa<1.

In the example of FIG. 8, the measured value is nearest the theoretical value of the trapezoidal distribution (α=0.2), and therefore the model determining section 160 may determine that the type of deterministic component included in the probability density function is a trapezoidal distribution. If the model determining section 160 determines that the measured value calculated by the measured value calculating section 150 is between the theoretical value of the uniform distribution and the theoretical value of the triangular distribution, a new trapezoid ratio a may be calculated to bring the theoretical value closer to the measured value. The model determining section 160 may determine the deterministic component model to be the trapezoidal distribution having the calculated trapezoid ratio α.

As a result of the above process, the model determining section 160 can accurately determine the model of the deterministic component included in the probability density function. Therefore, the random component and the deterministic component in the probability density function can be accurately calculated.

Figure 9:
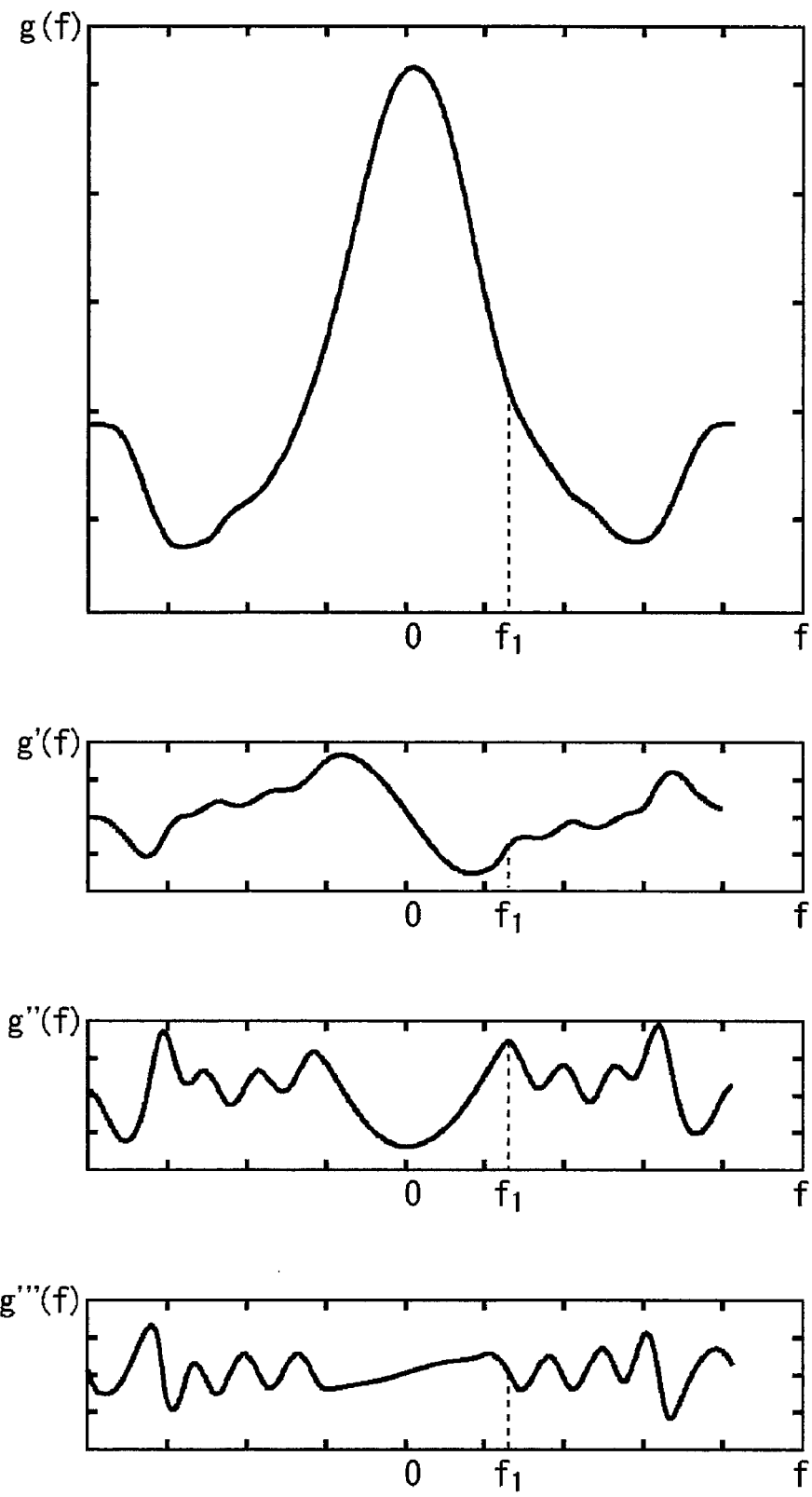
FIG. 9 shows an exemplary operation of the null frequency detecting section 130.

FIG. 9 shows an exemplary operation of the null frequency detecting section 130. The null frequency detecting section 130 of the present embodiment detects the first null frequency of the spectrum based on the peak of a waveform obtained by performing a second-order differentiation with respect to frequency on the spectrum calculated by the spectrum calculating section 120.

In the present embodiment, f1 represents the first null frequency of the spectrum. If the provided probability density function includes a small amount of noise, the first null frequency of the spectrum can be accurately detected. If, however, the provided probability density function includes a substantial amount of noise, as shown by the spectrum g(f) in FIG. 9, the first null frequency cannot be detected at the frequency f1 as intended.

In this case, the first null frequency can be accurately detected by differentiating the spectrum with respect to frequency, as shown in FIG. 9. The peak of the second-order differentiated waveform g"(f) of the spectrum corresponds to the null frequency of the spectrum g(f). Therefore, the null frequency detecting section 130 may perform a second-order derivation on the spectrum of the probability density function and detect the first null frequency based on the peak frequency of the derivative spectrum.

Figure 10:
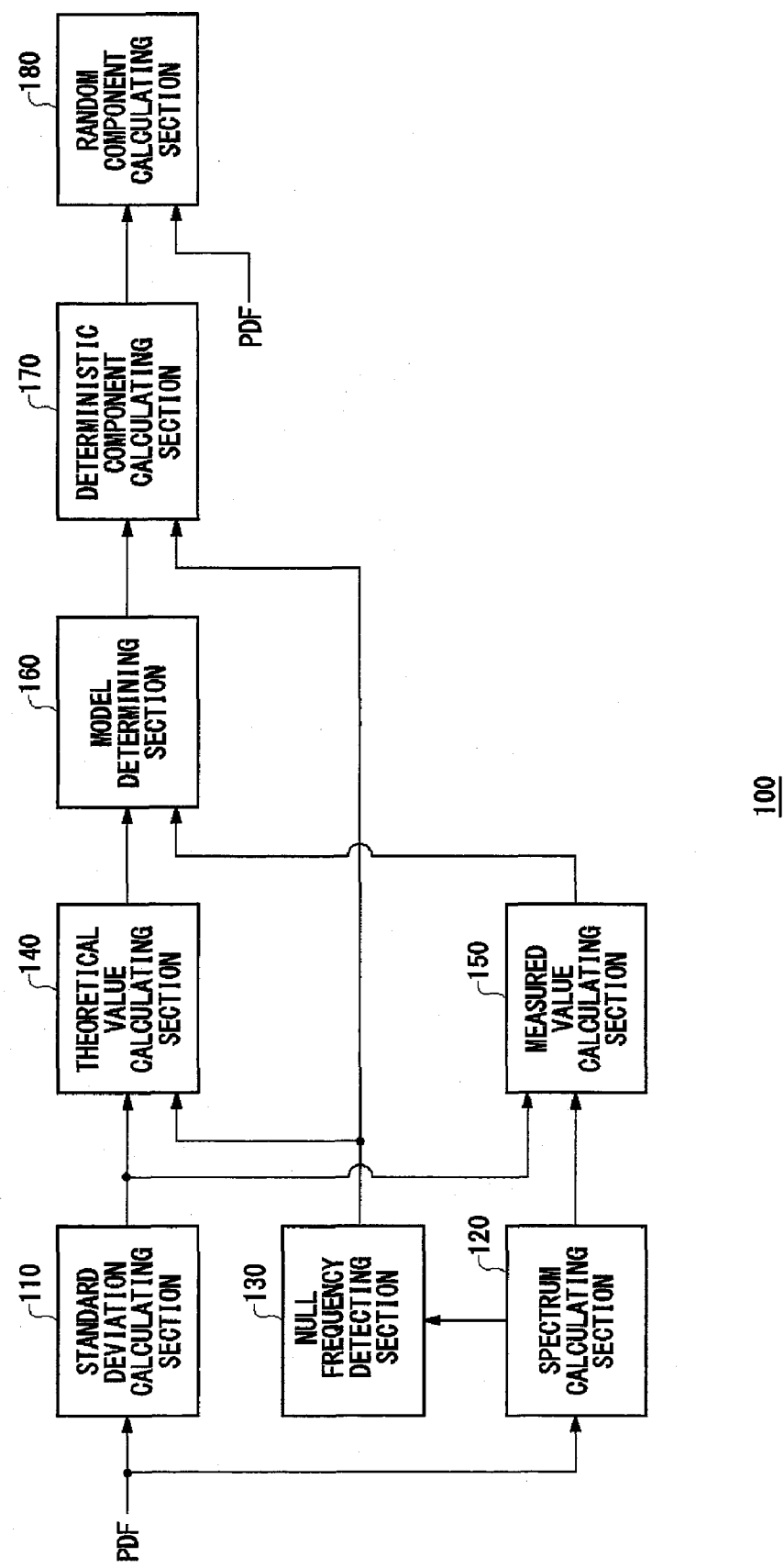
FIG. 10 shows another exemplary configuration of the deterministic component model determining apparatus 100.

FIG. 10 shows another exemplary configuration of the deterministic component model determining apparatus 100. The deterministic component model determining apparatus 100 of the present embodiment is further provided with a deterministic component calculating section 170 and a random component calculating section 180 in addition to the configuration of the deterministic component model determining apparatus 100 described in relation to FIG. 1. Other elements may be the same as the elements described in relation to FIG. 1.

The deterministic component calculating section 170 calculates the deterministic component included in the probability density function based on the type of the deterministic component determined by the model determining section 160 and the first null frequency detected by the null frequency detecting section 130. As shown in FIG. 7, the probability density function of the deterministic component in the frequency domain or the time domain can be determined from the type of the deterministic component and the peak-to-peak value $DJ_{P-P}$.

The deterministic component calculating section 170 may calculate the probability density function of the deterministic component by calculating the peak-to-peak value $DJ_{P-P}$ from the first null frequency. The deterministic component calculating section 170 may be provided with a table showing, for each type of deterministic component, a time-domain model, a frequency-domain model, a relation between the first null frequency $f_{zero}$ and the peak-to-peak value $DJ_{P-P}$, and the relationship between the peak-to-peak value $DJ_{P-P}$ and a root mean squared value $DJ_{RMS}$, as shown in FIG. 7.

The random component calculating section 180 calculates the random component included in the probability density function PDF by eliminating the deterministic component calculated by the deterministic component calculating section 170 from the probability density function PDF provided to the deterministic component model determining apparatus 100. For example, the random component calculating section 180 may calculate the random component in the time domain by deconvoluting the deterministic component in the time domain from the probability density function PDF in the time domain. The random component calculating section 180 may calculate the random component in the frequency domain by eliminating the deterministic component in the time domain from the probability density function PDF in the time domain. The random component calculating section 180 may further calculate the standard deviation of the calculated random component.

Using the configuration above enables the random component and the deterministic component in the probability density function to be accurately separated from each other. Therefore, when measuring jitter, for example, the target can be accurately evaluated because the random jitter and the deterministic jitter are accurately separated from each other.

Figure 11:
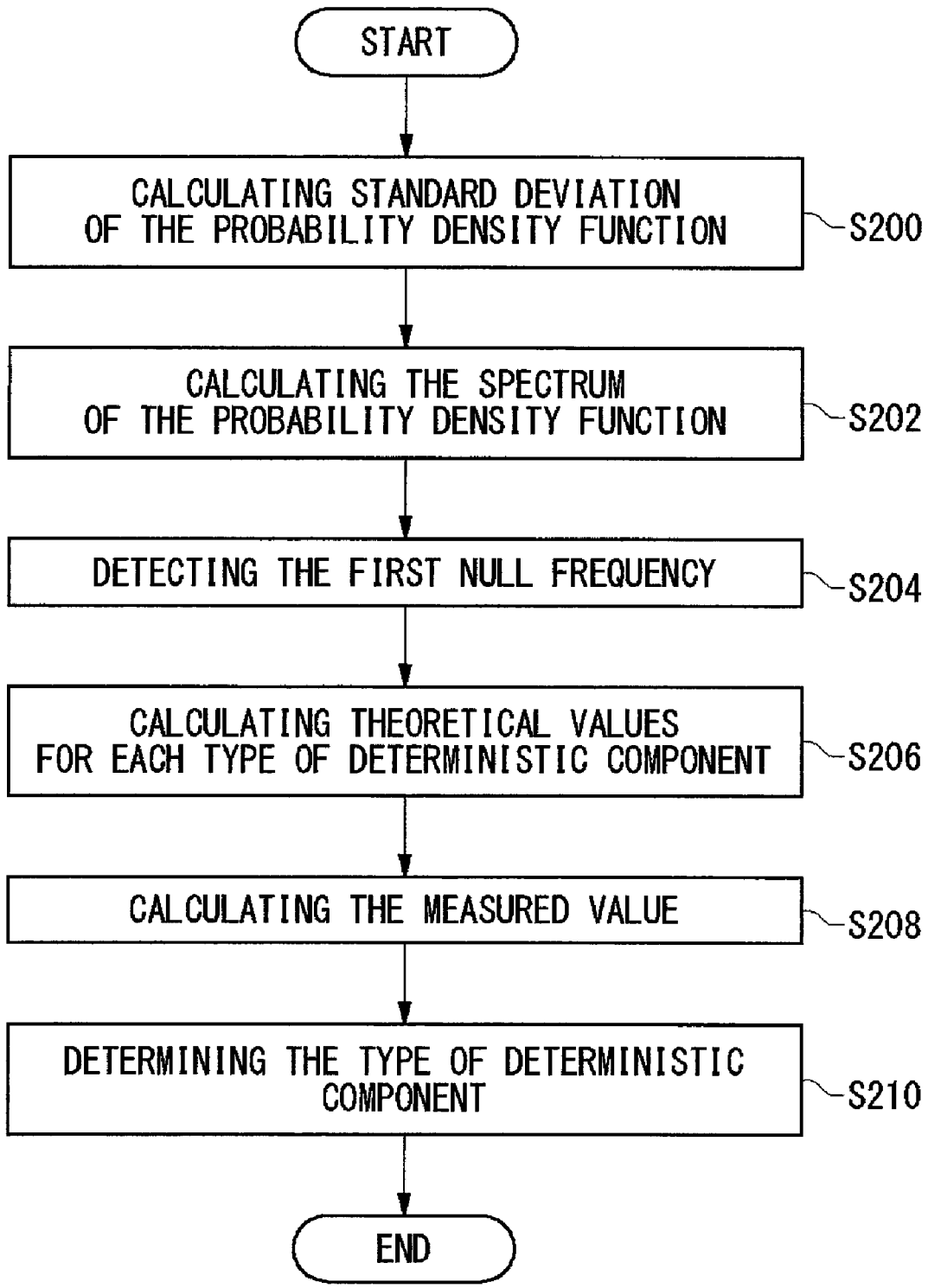
FIG. 11 is a flow chart showing the operation performed by the deterministic component model determining apparatus 100.

FIG. 11 is a flow chart showing the processes performed by the deterministic component model determining apparatus 100 for determining the model of the deterministic component. First, the standard deviation calculating section 110 calculates the standard deviation of the probability density function (S200). The spectrum calculating section 120 then calculates the spectrum of the probability density function (S202). Next, the null frequency detecting section 130 calculates the first null frequency of the spectrum calculated by the spectrum calculating section 120 (S204). The processes of S202 and S204 may be performed in parallel with the process of S200.

The theoretical value calculating section 140 calculates the theoretical values of each type of deterministic component based on the first null frequency detected by the null frequency detecting section 130 (S206). The measured value calculating section 150 then calculates the measured value of the deterministic component based on the standard deviation calculated by the standard deviation calculating section 110 and the spectrum calculated by the spectrum calculating section 120 (S208). The process of S208 may be performed in parallel with the process of S206.

The model determining section 160 compares each theoretical value calculated by the theoretical value calculating section 140 to the measured value calculated by the measured value calculating section 150 to determine the type of deterministic component included in the probability density function (S210). The processes described above enable the deterministic component model determining apparatus 100 to accurately determine the type of deterministic component.

Figure 12:
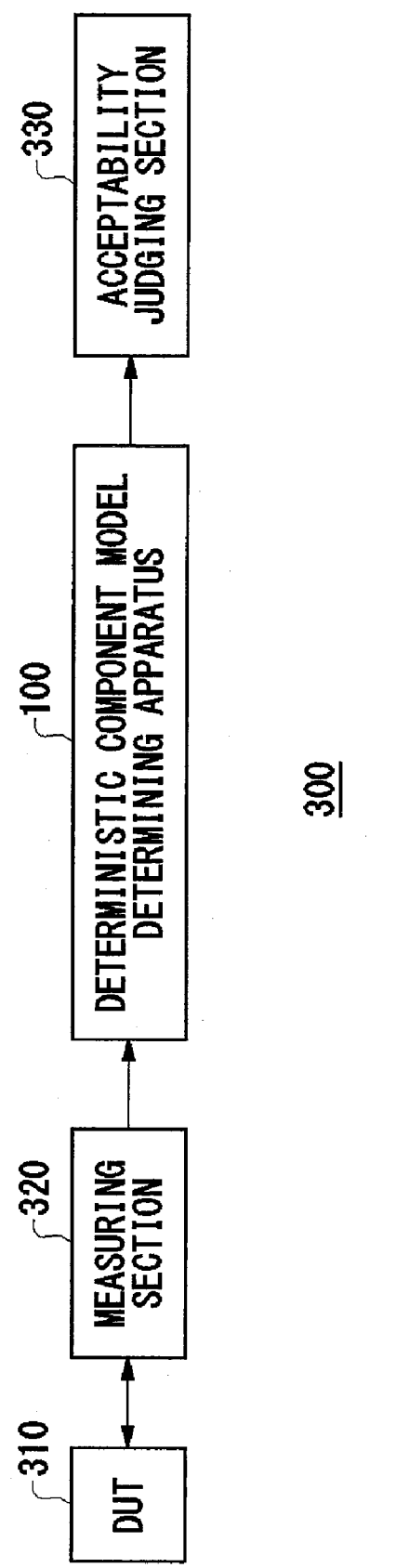
FIG. 12 shows an exemplary configuration of a test system 300 according to an embodiment of the present invention.

FIG. 12 shows an exemplary configuration of a test system 300 according to an embodiment of the present invention. The test system 300 tests a device under test such as a semiconductor circuit or a communication device. The test system 300 includes a measuring section 320, the deterministic component model determining apparatus 100, and an acceptability judging section 330.

The measuring section 320 measures a prescribed characteristic of the device under test 310 a plurality of times to generate a probability density function of the measured values of the characteristic. For example, the measuring section 320 measures the jitter, voltage, current, or the like of a signal output by the device under test 310.

The deterministic component model determining apparatus 100 determines the type of deterministic component included in the probability density function of the characteristic values measured by the measuring section 320. The deterministic component model determining apparatus 100 calculates at least one of the deterministic component and the random component included in the probability density function. The deterministic component model determining apparatus 100 may be the same as the deterministic component model determining apparatus 100 described in relation to FIG. 10.

The acceptability judging section 330 judges acceptability of the device under test 310 based on the deterministic component or the random component calculated by the deterministic component model determining apparatus 100. For example, the acceptability judging section 330 may judge whether the deterministic component or the random component calculated by the deterministic component model determining apparatus 100 fulfills a prescribed condition. The configuration described above enables the test system 300 to accurately judge the acceptability of the device under test 310.

Figure 13:
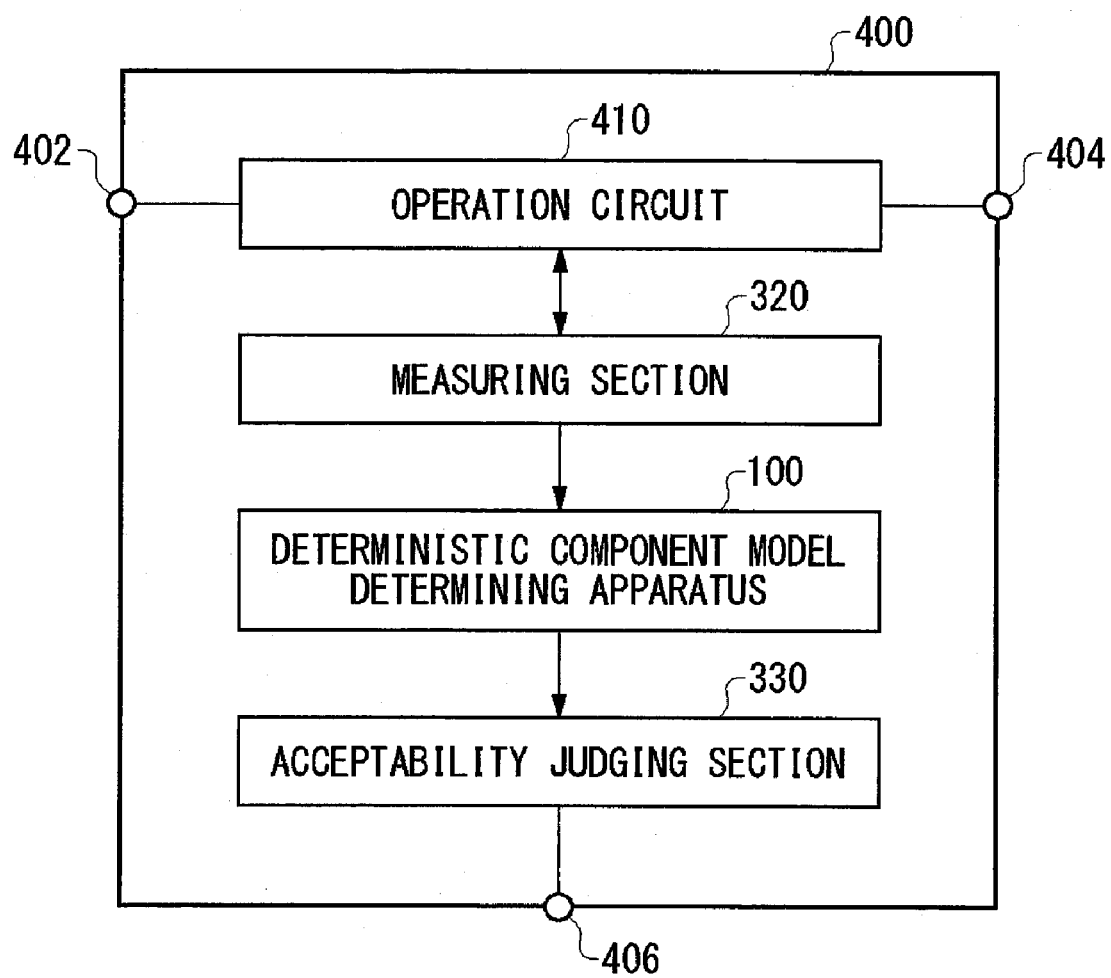
FIG. 13 shows an exemplary configuration of an electronic device 400 according to an embodiment of the present invention.

FIG. 13 shows an exemplary configuration of an electronic device 400 according to an embodiment of the present invention. The electronic device 400 of the present embodiment operates according to a signal supplied form an input pin 402 to output a prescribed generated signal from an output pin 404. The electronic device 400 includes an operation circuit 410, the measuring section 320, the deterministic component model determining apparatus 100, and the acceptability judging section 330.

The operation circuit 410 operates according to a signal supplied thereto. The operation circuit 410 may generate a prescribed signal according to a result of the operation. The measuring section 320, the deterministic component model determining apparatus 100, and the acceptability judging section 330 may function as a BIST circuit that tests whether the operation circuit 410 is operating properly.

The measuring section 320 performs a plurality of measurements of a prescribed characteristic of a prescribed signal generated by the operation circuit 410, to generate a probability density function. The deterministic component model determining apparatus 100 calculates the deterministic component and the random component included in the probability density function generated by the measuring section 320. The acceptability judging section 330 judges the acceptability of the operation circuit 410 based on the deterministic component and the random component calculated by the deterministic component model determining apparatus 100. The measuring section 320, the deterministic component model determining apparatus 100, and the acceptability judging section 330 may be the same as the measuring section 320, the deterministic component model determining apparatus 100, and the acceptability judging section 330 described in relation to FIG. 12.

The acceptability judging section 330 may instead output the acceptability judgment result to the outside via a test pin 406. The configuration described above provides an electronic device 400 that can accurately evaluate an internal operation circuit 410.

Figure 14:
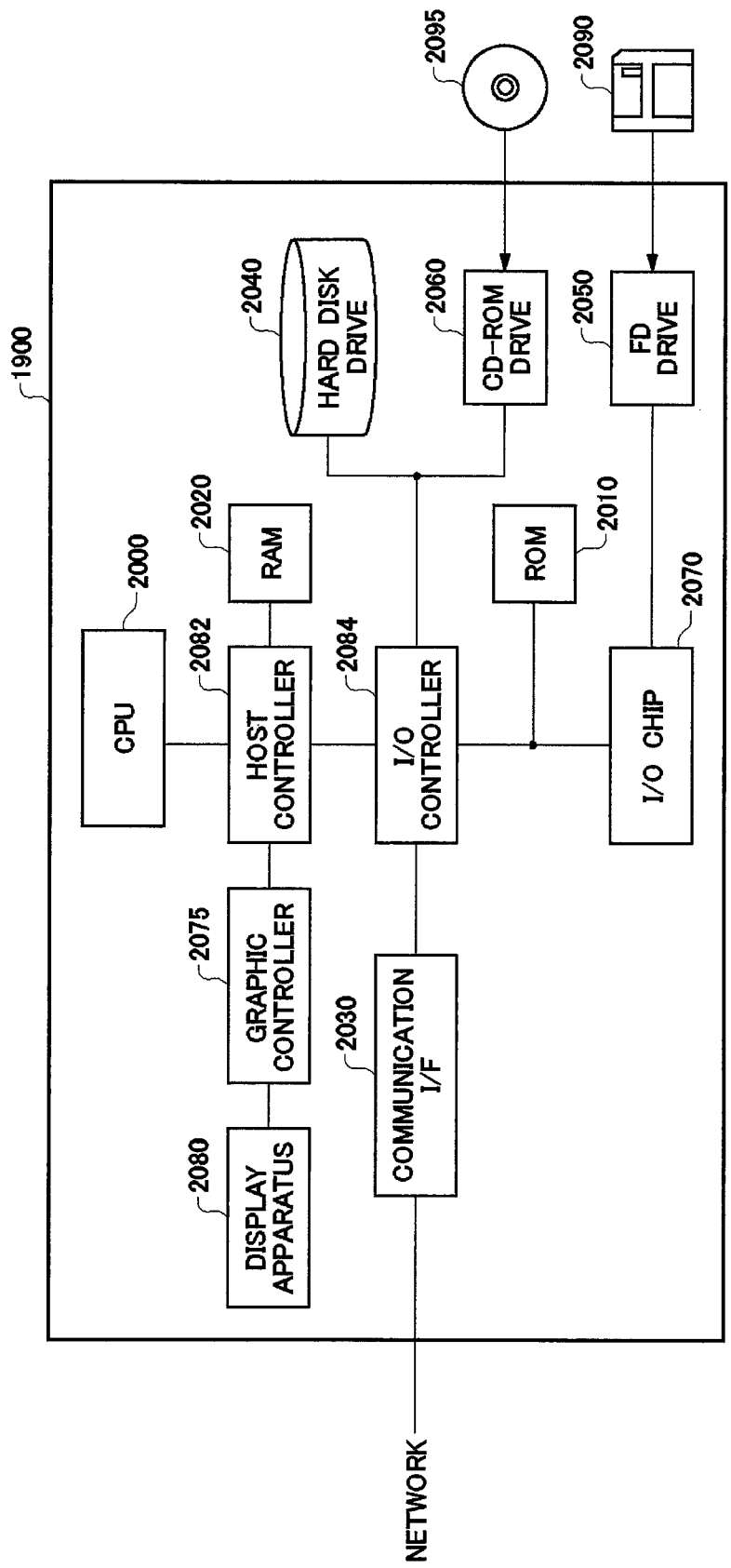
FIG. 14 shows an example of a hardware configuration of a computer 1900 according to an embodiment of the present invention.

FIG. 14 shows an example of a hardware configuration of a computer 1900 according to an embodiment of the present invention. The computer 1900 functions as the deterministic component model determining apparatus 100 described in relation to FIGS. 1 to 11, based on a program provided thereto. The program may cause the computer 1900 to function as each element of the deterministic component model determining apparatus 100 described in relation to FIGS. 1 to 11.

The computer 1900 according to the present embodiment is provided with a CPU peripheral including a CPU 2000, a RAM 2020, a graphic controller 2075, and a displaying apparatus 2080, all of which are connected to each other by a host controller 2082; an input/output section including a communication interface 2030, a hard disk drive 2040, and a CD-ROM drive 2060, all of which are connected to the host controller 2082 by an input/output controller 2084; and a legacy input/output section including a ROM 2010, a flexible disk drive 2050, and an input/output chip 2070, all of which are connected to the input/output controller 2084.

The host controller 2082 is connected to the RAM 2020 and is also connected to the CPU 2000 and graphic controller 2075 accessing the RAM 2020 at a high transfer rate. The CPU 2000 operates to control each section based on programs stored in the ROM 2010 and the RAM 2020. The graphic controller 2075 acquires image data generated by the CPU 2000 or the like on a frame buffer disposed inside the RAM 2020 and displays the image data in the displaying apparatus 2080. In addition, the graphic controller 2075 may internally include the frame buffer storing the image data generated by the CPU 2000 or the like.

The input/output controller 2084 connects the communication interface 2030 serving as a relatively high speed input/output apparatus, the hard disk drive 2040, and the CD-ROM drive 2060 to the host controller 2082. The communication interface 2030 communicates with other apparatuses via a network. The hard disk drive 2040 stores the programs and data used by the CPU 2000 housed in the computer 1900. The CD-ROM drive 2060 reads the programs and data from a CD-ROM 2095 and provides the read information to the hard disk drive 2040 via the RAM 2020.

Furthermore, the input/output controller 2084 is connected to the ROM 2010, and is also connected to the flexible disk drive 2050 and the input/output chip 2070 serving as a relatively high speed input/output apparatus. The ROM 2010 stores a boot program performed when the computer 1900 starts up, a program relying on the hardware of the computer 1900, and the like. The flexible disk drive 2050 reads programs or data from a flexible disk 2090 and supplies the read information to the hard disk drive 2040 via the RAM 2020. The input/output chip 2070 connects the flexible disk drive 2050 to each of the input/output apparatuses via, for example, a parallel port, a serial port, a keyboard port, a mouse port, or the like.

The programs provided to the hard disk drive 2040 via the RAM 2020 are stored in a storage medium, such as the flexible disk 2090, the CD-ROM 2095, or an IC card, and provided by a user. The programs are read from storage medium, installed in the hard disk drive 2040 inside the computer 1900 via the RAM 2020, and performed by the CPU 2000. These programs are installed in the computer 1900. These programs prompt the CPU 2000 or the like to make the computer 1900 function as the deterministic component model determining apparatus 100.

The programs shown above may also be stored in an external storage medium. The flexible disk 2090, the CD-ROM 2095, an optical storage medium such as a DVD or CD, a magneto-optical storage medium, a tape medium, a semiconductor memory such as an IC card, or the like can be used as the storage medium. Furthermore, a storage apparatus such as a hard disk or RAM that is provided with a server system connected to the Internet or a specialized communication network may be used to provide the programs to the computer 1900 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention can be used to realize a deterministic component model determining apparatus that can accurately determine the of deterministic component included in the probability density function.

What is claimed is:

1. A deterministic component model determining apparatus that determines a type of a deterministic component included in a probability density function supplied thereto, comprising:
    a standard deviation calculating section that calculates a standard deviation of the probability density function;
    a spectrum calculating section that calculates a spectrum of the probability density function;
    a null frequency detecting section that detects a null frequency of the spectrum;
    a theoretical value calculating section that calculates a theoretical value of a spectrum for each of a plurality of predetermined types of deterministic components, based on the null frequency detected by the null frequency detecting section;
    a measured value calculating section that calculates a measured value of the spectrum for the deterministic component included in the probability density function, based on the standard deviation calculated by the standard deviation calculating section and the spectrum calculated by the spectrum calculating section; and
    a model determining section that determines the type of the deterministic component included in the probability density function to be the type of deterministic component corresponding to a theoretical value closest to the measured value calculated by the measured value calculating section, from among the theoretical values calculated by the theoretical value calculating section for the plurality of types of deterministic components.

2. The deterministic component model determining apparatus according to claim 1, wherein
    the null frequency detecting section detects a first null frequency of the spectrum.

3. The deterministic component model determining apparatus according to claim 2, wherein
    the theoretical value calculating section calculates the theoretical value of the spectrum for each of the plurality of predetermined types of deterministic components, further based on the standard deviation calculated by the standard deviation calculating section.

4. The deterministic component model determining apparatus according to claim 2, wherein
    the theoretical value calculating section and the measured value calculating section calculate, as values of the spectrums, the theoretical values and the measured value at the same predetermined frequency of the spectrums.

5. The deterministic component model determining apparatus according to claim 4, wherein
    the theoretical value calculating section and the measured value calculating section calculate the values of the spectrums in a frequency range that is greater than 0 and less than the first null frequency.

6. The deterministic component model determining apparatus according to claim 2, wherein
    the measured value calculating section calculates the spectrum of the deterministic component included in the probability density function by dividing (i) the spectrum calculated by the spectrum calculating section by (ii) a spectrum of a Gaussian distribution having the standard deviation calculated by the standard deviation calculating section.

7. The deterministic component model determining apparatus according to claim 6, wherein
    the measured value calculating section calculates the spectrum having a frequency normalized with the first null frequency.

8. The deterministic component model determining apparatus according to claim 7, wherein
    the theoretical value calculating section calculates, for each of the plurality of types of deterministic components, the theoretical value of the spectrum normalized with the spectrum of the Gaussian distribution having the standard deviation calculated by the standard deviation calculating section.

9. The deterministic component model determining apparatus according to claim 8, wherein
    the theoretical value calculating section calculates the theoretical value of the spectrum having a frequency normalized with the first null frequency, for each of the plurality of types of deterministic components.

10. The deterministic component model determining apparatus according to claim 2, further comprising a deterministic component calculating section that calculates the deterministic component included in the probability density function, based on the type of the deterministic component determined by the model determining section and the first null frequency detected by the null frequency detecting section.

11. The deterministic component model determining apparatus according to claim 10, further comprising a random component calculating section that calculates a random component included in the probability density function by eliminating the deterministic component calculated by the deterministic component calculating section from the probability density function.

12. The deterministic component model determining apparatus according to claim 2, wherein
    the null frequency detecting section detects the first null frequency of the spectrum based on a peak of a waveform obtained by performing a second-order derivation with respect to frequency on the spectrum calculated by the spectrum calculating section.

13. A method for determining a type of a deterministic component included in a supplied probability density function, comprising:
    calculating a standard deviation of the probability density function;
    calculating a spectrum of the probability density function;
    detecting a null frequency of the spectrum;
    calculating a theoretical value of a spectrum for each of a plurality of predetermined types of deterministic components, based on the null frequency;
    calculating a measured value of the spectrum for the deterministic component included in the probability density function, based on the standard deviation and the spectrum; and
    determining the type of the deterministic component included in the probability density function to be the type of deterministic component corresponding to a theoretical value closest to the measured value from among the theoretical values calculated for the plurality of types of deterministic components.

14. A program causing a computer to function as a deterministic component model determining apparatus that determines a type of a deterministic component included in a probability density function supplied thereto, the computer being caused to function as:
   a standard deviation calculating section that calculates a standard deviation of the probability density function;
   a spectrum calculating section that calculates a spectrum of the probability density function;
   a null frequency detecting section that detects a null frequency of the spectrum;
   a theoretical value calculating section that calculates a theoretical value of a spectrum for each of a plurality of predetermined types of deterministic components, based on the null frequency detected by the null frequency detecting section;
   a measured value calculating section that calculates a measured value of the spectrum for the deterministic component included in the probability density function, based on the standard deviation calculated by the standard deviation calculating section and the spectrum calculated by the spectrum calculating section; and
   a model determining section that determines the type of the deterministic component included in the probability density function to be the type of deterministic component corresponding to a theoretical value closest to the measured value calculated by the measured value calculating section from among the theoretical values calculated by the theoretical value calculating section for the plurality of types of deterministic components.

15. A recording medium storing thereon the program according to claim 14.

16. A test system that tests a device under test, comprising:
   a measuring section that measures a prescribed characteristic of the device under test a plurality of times;
   a deterministic component model determining apparatus that determines a type of a deterministic component included in a probability density function of characteristic values measured by the measuring section and calculates the deterministic component of the probability density function; and
   an acceptability judging section that judges acceptability of the device under test based on the deterministic component calculated by the deterministic component model determining apparatus, wherein the deterministic component model determining apparatus includes,
   a standard deviation calculating section that calculates a standard deviation of the probability density function;
   a spectrum calculating section that calculates a spectrum of the probability density function;
   a null frequency detecting section that detects a null frequency of the spectrum;
   a theoretical value calculating section that calculates a theoretical value of a spectrum for each of a plurality of predetermined types of deterministic components, based on the null frequency detected by the null frequency detecting section;
   a measured value calculating section that calculates a measured value of the spectrum for the deterministic component included in the probability density function, based on the standard deviation calculated by the standard deviation calculating section and the spectrum calculated by the spectrum calculating section;
   a model determining section that determines the type of the deterministic component included in the probability density function to be the type of deterministic component corresponding to a theoretical value closest to the measured value calculated by the measured value calculating section from among the theoretical values calculated by the theoretical value calculating section for the plurality of types of deterministic components; and
   a deterministic component calculating section that calculates the deterministic component included in the probability density function, based on the type of the deterministic component determined by the deterministic component model determining apparatus and the null frequency detected by the null frequency detecting section.

17. An electronic device that generates a prescribed signal, comprising:
   an operation circuit that generates and outputs the prescribed signal;
   a measuring section that measures a prescribed characteristic of the prescribed signal a plurality of times; and
   a deterministic component model determining apparatus that determines a type of a deterministic component included in a probability density function of characteristic values measured by the measuring section and calculates the deterministic component of the probability density function, wherein the deterministic component model determining apparatus includes,
   a standard deviation calculating section that calculates a standard deviation of the probability density function;
   a spectrum calculating section that calculates a spectrum of the probability density function;
   a null frequency detecting section that detects a null frequency of the spectrum;
   a theoretical value calculating section that calculates a theoretical value of a spectrum for each of a plurality of predetermined types of deterministic components, based on the null frequency detected by the null frequency detecting section;
   a measured value calculating section that calculates a measured value of the spectrum for the deterministic component included in the probability density function, based on the standard deviation calculated by the standard deviation calculating section and the spectrum calculated by the spectrum calculating section; and
   a model determining section that determines the type of the deterministic component included in the probability density function to be the type of deterministic component corresponding to a theoretical value closest to the measured value calculated by the measured value calculating section from among the theoretical values calculated by the theoretical value calculating section for the plurality of types of deterministic components.

* * * * *